United States Patent
Viorel et al.

(10) Patent No.: US 10,349,342 B2
(45) Date of Patent: Jul. 9, 2019

(54) SYSTEM INFORMATION BROADCAST IN MACHINE-TO-MACHINE RADIO ACCESS SYSTEMS

(71) Applicant: FUJITSU CONNECTED TECHNOLOGIES LIMITED, Kawasaki-shi, Kanagawa (JP)

(72) Inventors: Dorin G. Viorel, Calgary (CA); Paul Bucknell, Brighton (GB); Akira Ito, San Jose, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 14/908,504

(22) PCT Filed: Feb. 10, 2014

(86) PCT No.: PCT/US2014/015626
§ 371 (c)(1),
(2) Date: Jan. 28, 2016

(87) PCT Pub. No.: WO2015/026392
PCT Pub. Date: Feb. 26, 2015

(65) Prior Publication Data
US 2016/0212686 A1    Jul. 21, 2016

Related U.S. Application Data

(60) Provisional application No. 61/868,993, filed on Aug. 22, 2013.

(51) Int. Cl.
| H04W 72/04 | (2009.01) |
| H04W 48/10 | (2009.01) |
| H04W 4/70  | (2018.01) |

(52) U.S. Cl.
CPC ............. *H04W 48/10* (2013.01); *H04W 4/70* (2018.02); *H04W 72/04* (2013.01); *H04W 72/048* (2013.01)

(58) Field of Classification Search
CPC ... H04W 4/005; H04W 72/04; H04W 72/042; H04W 72/048; H04W 72/1289
See application file for complete search history.

(56) References Cited

U.S. PATENT DOCUMENTS

| 5,839,052 A | 11/1998 | Dean et al. |
| 6,088,332 A | 7/2000 | Suters et al. |

(Continued)

FOREIGN PATENT DOCUMENTS

| CN | 1371576 A | 9/2002 |
| CN | 101390425 A | 3/2009 |

(Continued)

OTHER PUBLICATIONS

U.S. Office Action dated Oct. 7, 2016 in U.S. Appl. No. 14/229,721.

(Continued)

*Primary Examiner* — Scott M Sciacca
(74) *Attorney, Agent, or Firm* — Myers Wolin, LLC

(57) ABSTRACT

A method may include detecting multiple system-information block (SIB) blocks and associated content. The associated content may be stored. The method may further include detecting multiple change flags associated with the multiple SIB blocks, each of the multiple change flags associated with one of the multiple SIB blocks. In response to detecting a change flag having a first change flag value, content of the SIB block associated with the first change flag may be reused. The first change flag value may represent an absence of a change to the content of the SIB block associated with the first change flag. In response to detecting the change flag having a second change flag value, the SIB block associated (Continued)

with the second change flag may be detected and the associated content stored. The second change flag value may represent a change to the content of the associated SIB blocks.

20 Claims, 5 Drawing Sheets

(56) References Cited

U.S. PATENT DOCUMENTS

| | | | |
|---|---|---|---|
| 6,628,946 B1 | 9/2003 | Wiberg et al. | |
| 6,745,221 B1 | 6/2004 | Ronca | |
| 2008/0267136 A1 | 10/2008 | Baker et al. | |
| 2009/0221293 A1* | 9/2009 | Petrovic | H04W 48/10 455/450 |
| 2010/0075625 A1* | 3/2010 | Wu | H04W 4/22 455/404.1 |
| 2010/0272017 A1* | 10/2010 | Terry | H04W 48/12 370/328 |
| 2010/0297979 A1 | 11/2010 | Watfa et al. | |
| 2011/0268046 A1 | 11/2011 | Choi et al. | |
| 2011/0310731 A1 | 12/2011 | Park et al. | |
| 2012/0039171 A1* | 2/2012 | Yamada | H04L 47/12 370/232 |
| 2012/0281619 A1 | 11/2012 | Tao et al. | |
| 2012/0322467 A1 | 12/2012 | Obuchi et al. | |
| 2013/0077584 A1 | 3/2013 | Lee et al. | |
| 2013/0083753 A1 | 4/2013 | Lee et al. | |
| 2013/0121225 A1 | 5/2013 | Ryu | |
| 2013/0155974 A1 | 6/2013 | Papasakellariou et al. | |
| 2013/0208673 A1 | 8/2013 | Petermann et al. | |
| 2014/0056229 A1 | 2/2014 | Li et al. | |
| 2014/0098761 A1* | 4/2014 | Lee | H04W 74/006 370/329 |
| 2014/0133381 A1* | 5/2014 | Zhu | H04W 48/16 370/312 |
| 2014/0192659 A1 | 7/2014 | Tian et al. | |
| 2014/0198685 A1* | 7/2014 | Xu | H04W 24/02 370/254 |
| 2014/0348116 A1 | 11/2014 | Yamada et al. | |
| 2014/0362831 A1* | 12/2014 | Young | H04L 5/0037 370/336 |
| 2015/0043461 A1 | 2/2015 | Sachs et al. | |
| 2015/0223028 A1* | 8/2015 | Wang | H04W 4/005 370/312 |
| 2015/0382284 A1* | 12/2015 | Brismar | H04W 74/04 370/329 |
| 2016/0198406 A1* | 7/2016 | Hoglund | H04W 48/08 370/311 |

FOREIGN PATENT DOCUMENTS

| | | |
|---|---|---|
| CN | 103069869 A | 4/2013 |
| WO | 00/72609 A1 | 11/2000 |
| WO | 2010/120689 A2 | 10/2010 |
| WO | 2012/084001 A1 | 6/2012 |

OTHER PUBLICATIONS

Advisory Action for related U.S. Appl. No. 14/229,721, dated Dec. 16, 2016.
Huawei et al:. "Introduction of EAB in 25.331." 3GPP Work Item SIMTC-RAN_OC-Core Mapping to Specs. N.p., n.d. Web. May 9, 2017.
European Search Report dated Feb. 6, 2017 in application No. 14837947.2.
Kaijie Zhou, et al., "Contention based access for machine-type communications over LTE" May 6, 2012, Vehicular Technology Conference (VTC Spring), 2012 IEEE 75th, pp. 1-5.
U.S. Office Action dated Apr. 21, 2016 in U.S. Appl. No. 14/229,721.
Communication pursuant to Article 94(3) EPC issued by the European Patent Office for corresponding European Patent Application No. 14 837 947.2-1853, dated Nov. 2, 2017.
First Notification of Office Action and search report issued by the State Intellectual Property Office of China for corresponding Chinese Patent Application No. 201480046106.3, dated Dec. 20, 2017, with an English translation.
Notice of Preliminary Rejection issued by the Korean Intellectual Property Office for corresponding Korean Patent Application No. 10-2016-7005315, dated Jul. 3, 2017, with English translation.
Nokia Siemens Networks, "Additional update due to normal SIB modification", Agenda Item: 5.1, 3GPP TSG-RAN WG2 Meeting #79, R2-123678, Qingdao, China, Aug. 13-17, 2012.
Ericsson et al, "System information for enhanced coverage MTC UE", Agenda Item: 72.4.2, 3GPP TSG-RAN WG1 Meeting #74, R1-133422, Barcelona, Spain, Aug. 19-23, 2013.
Second Notification of Office Action and search report issued by the State Intellectual Property Office of China for corresponding Chinese Patent Application No. 201480046106.3, dated Aug. 16, 2018, with an English translation.
Non-Final Office Action issued by the United States Patent and Trademark Office for corresponding U.S. Appl. No. 14/229,721, dated Jul. 25, 2017.
Notice of Last Preliminary Rejection issued by the Korean Intellectual Property Office for corresponding Korean Patent Application No. 10-2016-7005315, dated Jan. 10, 2018, with English translation.
Notification of Reasons for Refusal issued by the Japan Patent Office for corresponding Japanese Patent Application No. 2016-536081, dated Jun. 20, 2017, with an English translation.
Qualcomm Incorporated et al., "On paging impacts due to EAB SIB update in UMTS", Agenda Item: 5.1, 3GPP TSG-RAN WG2 Meeting #78, R2-122873, Prague, Czech Republic, May 21-25, 2012.
Samsung, "Approach for EAB notification", Agenda Item: 4.3.1, 3GPP TSG-RAN WG2 Meeting #75bis, R2-115036, Zhuhai, China, Oct. 10-14, 2011.
Catt, "Further Considerations on EAB update Mechanism", Agenda Item: 5.1.2, 3GPP TSG-RAN WG2 Meeting #76, R2-115800, San Francisco, USA, Nov. 14-18, 2011.
Qualcomm Europe, "Granularity of information at SIB modification", Agenda Item: 6.2.1.6, 3GPP TSG-RAN WG2 Meeting #63bis, R2-085587, Prague, Czech Republic, Sep. 29-Oct. 3, 2008.
Huawei et al., Change Request for "Introduction of EAB in 25.331", 3GPP TSG-RAN WG2 Meeting #79, R2-124303, Qingdao, P.R. China, Aug. 13-17, 2012.
Communication pursuant to Article 94(3) EPC issued by the European Patent Office for corresponding European Patent Application No. 14 837 947.2-1213, dated Jul. 10, 2018.
Decision of Refusal issued by the Japan Patent Office for corresponding Japanese Patent Application No. 2016-538081, dated Oct. 23, 2018, with an English translation.
Third Notification of Office Action issued by the China National Intellectual Property Administration for corresponding Chinese Patent Application No. 201480046106.3, dated Apr. 10, 2019, with an English translation.
Communication pursuant to Article 94(3) EPC issued by the European Patent Office for corresponding European Patent Application No. 14 837 947.2-1213, dated May 3, 2019.

* cited by examiner

SYSTEM INFORMATION BROADCAST IN MACHINE-TO-MACHINE RADIO ACCESS SYSTEMS

FIELD

The embodiments discussed herein are related to machine-type communication.

BACKGROUND

Radio access communication networks such as Long Term Evolution (LTE) and Long Term Evolution Advanced (LTE-A) networks may be used for machine-to-machine (M2M) communications, also known as machine-type communications (MTC). Generally, MTC may allow an unmanned terminal to wirelessly and remotely report information over the radio access network to a central dedicated server, which may distribute the information to one or more suitable MTC applications and/or an MTC server that collects the information. Terminals with MTC compatibility may be used in a variety of situations. An example of such a situation may include smart meters that report resource consumption, measurements, and/or special events to a utility company server via the radio access communication network. Other examples of applications that may utilize MTC include security networks for use in surveillance, alarm systems or people tracking systems, transportation networks, fleet management, connected cars, city automation, toll collection, emission control, electronic health (eHealth) applications; manufacturing monitoring and automation, and facility management, including homes, buildings, etc.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include detecting, from a downlink channel in a wireless communication network, multiple system-information block (SIB) blocks and content associated with each of the multiple SIB blocks. The method may further include storing the content associated with each of the multiple SIB blocks. The method may further include detecting, from the downlink channel in the wireless communication network, a transmission including multiple change flags associated with the multiple SIB blocks, each of the multiple change flags associated with one of the multiple SIB blocks. In response to detecting a change flag of the multiple change flags having a first change flag value, the method may include reusing the content of the SIB block associated with the change flag. The first change flag value may represent an absence of a change to the content of the SIB block associated with the first change flag. In response to detecting the change flag having a second change flag value, the method may include detecting the SIB block associated with the change flag and storing the content of the SIB block associated with the change flag. The second change flag value may represent a change to the content of the SIB block associated with the change flag. The method may further include selectively detecting SIB blocks having changed content based on the change flag values of the multiple change flags.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein may relate to a radio access system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example radio access systems described. Rather, the embodiments described herein may also be applicable to other radio access systems.

Embodiments of the present invention will be explained with reference to the accompanying drawings.

Figure 1:
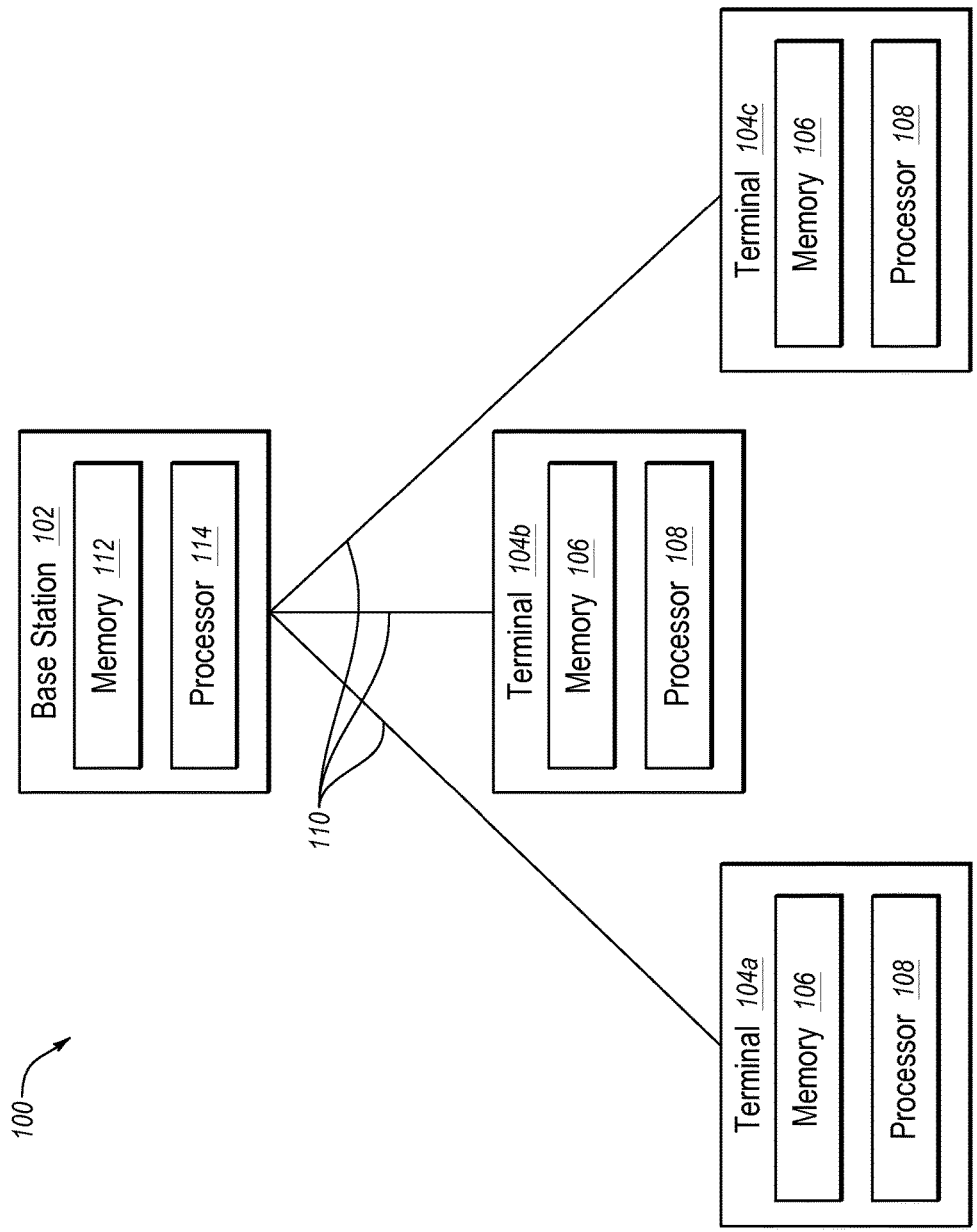
FIG. 1 is a diagram of an example radio access system.

FIG. 1 is a diagram of an example radio access system 100, arranged in accordance with at least one embodiment described herein. In some embodiments, a radio access network architecture of the radio access system 100 may include the radio access network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The radio access system 100 may include a base station 102. The base station 102 may include hardware and software for radio communication in certain frequency bands, which are usually licensed. For example, the base station 102 may be equipped for communication over an air interface 110 with devices such as terminal 104*a*, terminal 104*b*, and terminal 104*c* (collectively "terminals 104"). The base station 102 may generally allow the terminals 104 to wirelessly communicate with a core network (not shown) via the air interface 110 with the base station 102.

The base station 102 may include hardware and/or software for radio communication usually over a licensed spectrum. Alternately or additionally, the base station 102 may include hardware and/or software for radio communication over an unlicensed spectrum. The licensed spectrum may generally include portions of a radio spectrum licensed for data transmission. For example, the base station 102 may be configured to process, transmit, and receive data that complies with an LTE radio access network, such as an LTE radio access network according to 3GPP LTE specification releases 8-12. The base station 102 may include an E-UTRAN NodeB (eNB) associated with LTE radio access networks. The base station 102 may include memory 112, a processor 114, and one or more radio frequency transceivers with their associated front end sections (not shown). The memory 112 may include a non-transitory computer-readable medium. Instructions such as programming code executable by the processor 114 may be encoded in the memory 112. When the instructions are executed by the processor 116, the base station 102 may perform operations related to and/or including the processes described herein.

The terminals 104 may include equipment configured to allow the terminals 104 to transmit and receive data via wireless communications via the licensed spectrum. For example, the terminals 104 may include dedicated hardware, such as one or more radio frequency transceivers with their associated front end sections for transmitting and receiving radio transmissions, and the base band processors, including the related protocol codecs. The terminals 104 may employ machine-type communication (MTC) hardware and/or software configured for communication with an MTC server (not shown) in communication, possibly part of the core network. Examples of such terminals 104 may include, but are not limited to, surveillance and alarm devices, utility measuring and metering devices, manufacturing monitoring and automation devices, facility management devices, and the like. Alternately or additionally, the terminals 104 may include, but are not limited to, mobile phones, tablet computers, laptop computers, and/or other electronic devices that may use radio communication.

Each of the terminals 104 may include memory 106, a processor 108, and one or more radio frequency transceiver sections (not shown). The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

Connection setup procedures between the terminals 104 and the base station 102 may be completed before the terminals 104 may transmit data to the base station 102 via the air interface 110. Connection setup procedures may include synchronizing the terminals 104 to the base station 102 as well as performing random-access procedures with the base station 102. In some embodiments, the random access procedures between the terminals 104 and the base station 102 may include messages generally corresponding to the messages exchanged during a random access procedure associated with LTE radio access networks.

The base station 102 may be associated with a cell within which the terminals 104 are located. In some instances, the terminals 104 within the cell associated with the base station 102 may experience a coverage deficit. The terminals 104 experiencing a coverage deficit may be located within the cell coverage associated with the base station 102, but may experience a reception signal quality below a cell edge level associated with a lowest reception power level provided to human users. For example, the terminals 104 experiencing coverage deficits may experience a signal-to-interference-and-noise ratio (SINR) below a cell edge SINR. By way of example, the terminals 104 experiencing coverage deficits may be located in coverage-challenged environments such as basements, equipment rooms, or the like.

Downlink (DL) and uplink (UL) physical channel repetition-based patterns may be employed to permit the terminals 104 experiencing coverage deficits to perform radio communications via the air interface 110 despite the coverage deficits. In some instances, the terminals 104 experiencing coverage deficits may attempt to decode system information broadcast by the base station 102. The terminals 104 experiencing coverage deficits may attempt to decode a master-information block (MIB) transmission over a broadcast channel (BCH) associated with LTE radio access networks. Following a successful MIB decoding, the terminals 104 experiencing coverage deficits may attempt to decode a selection of system-information block (SIB) transmissions on a downlink shared channel (DL-SCH) associated with LTE radio access networks.

In some instances, the terminals 104 experiencing coverage deficits may decode the MIB transmission for parameters to be used by the terminals 104 to initially access a network via the base station 102. For example, the terminals 104 may further decode a system-information-block-one (SIB1) transmission to determine whether a cell associated with the base station 102 is appropriate for the capabilities terminals 104 to be selected. The SIB1 transmission may include system information value tags and/or time-domain scheduling of other SIBs.

A timing and periodicity of the MIB transmission and SIB1 transmission may be known in advance. A timing and/or periodicity of other SIBs, such as a system-information-block-two (SIB2) transmission, a system-information-block-three (SIB3) transmission, and/or the like may be variable and may be indicated by the SIB1 transmission.

The terminals 104 may decode the SIB2 transmission for determining information related to cell access. The SIB2 transmission may include, for example, random access channel (RACH) related parameters, idle-mode paging configurations, physical uplink control channel (PUCCH) configurations, physical uplink shared channel (PUSCH) configurations, UL power control and sounding reference signal configurations, UL carrier frequency and/or bandwidth information, cell barring information, or the like or any combination thereof.

The MIB transmission, the SIB1 transmission, and the SIB2 transmission may include information possibly grouped in information elements (IEs) associated with LTE radio access networks.

Employing repetition-based patterns may cause the terminals 104 experiencing coverage deficits to experience an SIB transmission decoding latency, due to the increased processing time. In some instances, the terminals 104 experiencing a coverage deficit of −15 dB or more may have two receiving antennas and an MIB transmission instance may be repeated on a central band five times (or some other multiple) such that the terminals 104 may detect the MIB transmission. In some instances, using a physical broadcast channel (PBCH) power boost with the MIB transmission on the central band may not be desirable due to its proximity to a primary synchronization channel (PSCH) sequence.

Similarly, the terminals 104 experiencing a coverage deficit of −15 dB may have one receiving antenna and the MIB transmission instance may be repeated on the central band defined across a contiguous physical allocation of six physical resource blocks (PRBs) ten times, across four consecutive frames and may result in an estimated up to 27.4-percent resource penalty. As a result, repeating MIB transmissions on the central band for the terminals 104 experiencing coverage deficits may not be physical-resource efficient, as an estimated 13.7 percent to 27.4 percent of the resources on the central band (depending on whether one or two terminal receivers are employed) may be allocated for a subset of the machine terminals 104. Furthermore, repeating instances of SIB transmissions on the central band may be similarly inefficient.

In some instances the terminals 104 experiencing the −15 dB coverage deficit may experience up to approximately 7.5 second (s) latency, assumptions dependent, in the synchronization with eNB, decoding the MIB transmission, SIB1 transmission, and the SIB2 transmission.

In some embodiments set forth herein, the MIB and/or SIB transmission decoding latencies experienced by the terminals 104 experiencing a coverage deficit may be reduced. Alternately or additionally, some embodiments set forth herein may improve central band efficiency for human traffic when coverage deficit machine devices are serviced.

Some embodiments may adapt the existing MIB content transmission defined on the central band associated with LTE radio access networks, for machine devices experiencing large coverage deficits. In another embodiment, a new MTC PBCH may be defined for this particular class of devices. Additionally, a new system-information-block-two-machine-type-communication (SIB2M) block may be defined and implemented in some embodiments for the herein class of machine devices. In some embodiments, the SIB2M block may include information for random access procedures by MTC devices, indicating a random access channel (RACH) configuration. In another embodiment, alternately, a new MTC resource allocation may be defined for this specific class of machine devices and implemented. The MTC resource allocation may comprise the MTC MIB, the SIB1, the SIB2, and/or the SIB2M transmissions.

Since most of the SIB1 content and the SIB2 content is not refreshed during every cycle, it is reasonable to identify a system-information-block-x (SIBx) block associated with a subset of system information content (in some cases this subset could be a part of SIB2 content) that may be subject to a high refresh rate relative to the remainder of the system information content. In some instances, system information having a high refresh rate may include a subset of system information subject to change at a rate above an average system information change rate. The SIBx block system information content may have a higher refresh rate than both the SIB1 block system information content and the SIB2 system information content. In some embodiments, multiple SIBx blocks may be employed.

By way of example, the SIBx block may include information elements (IEs) associated with LTE radio access network's (RAN) system random access channel configuration for MTC devices, including, but not limited to, preambleInfo, numberOfRA-Preambles, preamblesGroupA-Config, sizeOfRA-PreamblesGroupA, messageSizeGroupA, messagePowerOffsetGroupB, prach-Config, root-SequenceIndex, prach-ConfigInfo, prach-ConfigIndex, highSpeedFlag, zeroCorrelationZoneConfig, prach-FreqOffset, or the like or any combination thereof.

For example, the SIBx block may be the SIB2M block. Descriptions of the SIB2M block herein may alternately or additionally apply to other SIBx subsets. Identifying one or more SIBx subsets may reduce significant repetitions of the SIB1 and the SIB2 supporting coverage deficit devices.

The SIB2M transmission may have a reduced payload. The SIB2M transmission may be broadcast with a particular repetition-based pattern suitable for detection by the terminals 104 experiencing a coverage deficit. In some embodiments, the SIB2M transmission may be detected within one SIB2 transmission cycle.

In some embodiments, change flags may be defined for indicating changes to the SIB1 content, the SIB2 content, and/or the SIB2M content. The base station 102 may transmit the change flags as part of the MIB content. The terminals 104 may store information from previously decoded SIB1 information blocks, previously decoded SIB2 information blocks, and/or previously decoded SIB2M information blocks. The terminals 104 may re-use the stored information associated with the previous successful reception of the SIB1 information blocks, the SIB2 information blocks, and/or the SIB2M information blocks depending on values of received change flag information, which indicate that the information associated with the SIB1 content, the SIB2 content, and/or the SIB2M content changed during a given amount of time. Based on the values of the change flags, the terminals may selectively detect the SIB1 information blocks, the SIB2 information blocks, and/or the SIB2M information blocks having changed content. The change flags may be included in a central-band MIB transmission, or alternately may be included in an MTC resource allocation MIB transmission, in instances where an MTC resource allocation is defined.

Figure 2:
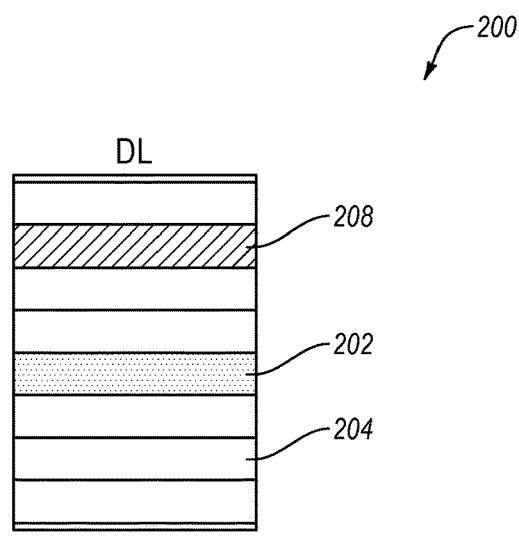
FIG. 2 is a diagram of an example time and frequency resource allocation that may be implemented in the radio access system of FIG. 1.

FIG. 2 is a diagram of an example time and frequency resource allocation 200 that may be implemented in the radio access system 100 of FIG. 1. The resource allocation 200 may be associated with a bandwidth of ten megahertz (MHz) and may be configured on DL resources. In some instances, the resource allocation 200 may be associated with 50 PRBs referred to as PRB zero through PRB 49.

The resource allocation 200 may include a central resource allocation 202. In some instances, the central resource allocation 202 may be defined across six PRBs and may be located on a PRB 20 through a PRB 25, if a ten MHz band is assumed. In some embodiments, one or more dedicated MTC resource allocations may be defined across one or more sets of contiguous or non-contiguous PRB groups. The resource allocation 200 may include resource allocations 204 that may be generally associated with non-MTC traffic (usually human oriented traffic).

In some embodiments, the resource allocation 200 may include a DL MTC resource allocation 208. The DL MTC resource allocation 208 may be defined across six PRBs and may be located, as an example, on a PRB 38 through a PRB 43. However, the DL MTC resource allocation 208 may alternately or additionally be located on other contiguous or non-contiguous PRB groups.

In some embodiments, additional resources may be dedicated to terminals experiencing coverage deficits when terminals experiencing coverage deficits are detected. The resources dedicated to terminals experiencing coverage deficits may be dedicated on a dynamic or semi-static basis.

Figure 3:
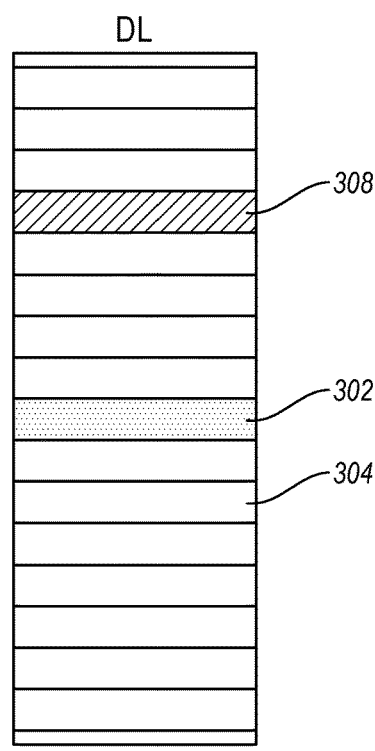
FIG. 3 is a diagram of another example time and frequency resource allocation that may be implemented in the radio access system of FIG. 1.

FIG. 3 is a diagram of another example time and frequency resource allocation 300 that may be implemented in the radio access system 100 of FIG. 1. The resource allocation 300 may be associated with a bandwidth of 20 MHz and may be configured on DL resources. In some instances, the resource allocation 300 may be associated with 100 PRBs referred to as PRB zero through PRB 99.

The resource allocation 300 may include a central resource allocation 302 generally corresponding to the central resource allocation 202 of FIG. 2. In some instances, the central resource allocation 302 may be located on a PRB 45 through a PRB 50. The resource allocation 300 may alternately or additionally include resource allocation 304, allocated for human traffic, generally corresponding to the resource allocations 204 of FIG. 2. In some embodiments, the resource allocation 300 may include a DL MTC resource allocation 308 generally corresponding to the DL MTC resource allocation 208 of FIG. 2. The DL MTC resource allocation 308 may be located, as an example, on a PRB 75 through a PRB 80. However, the DL MTC resource allocation 308 may alternately or additionally be located on other contiguous or non-contiguous PRB groups.

Figure 4:
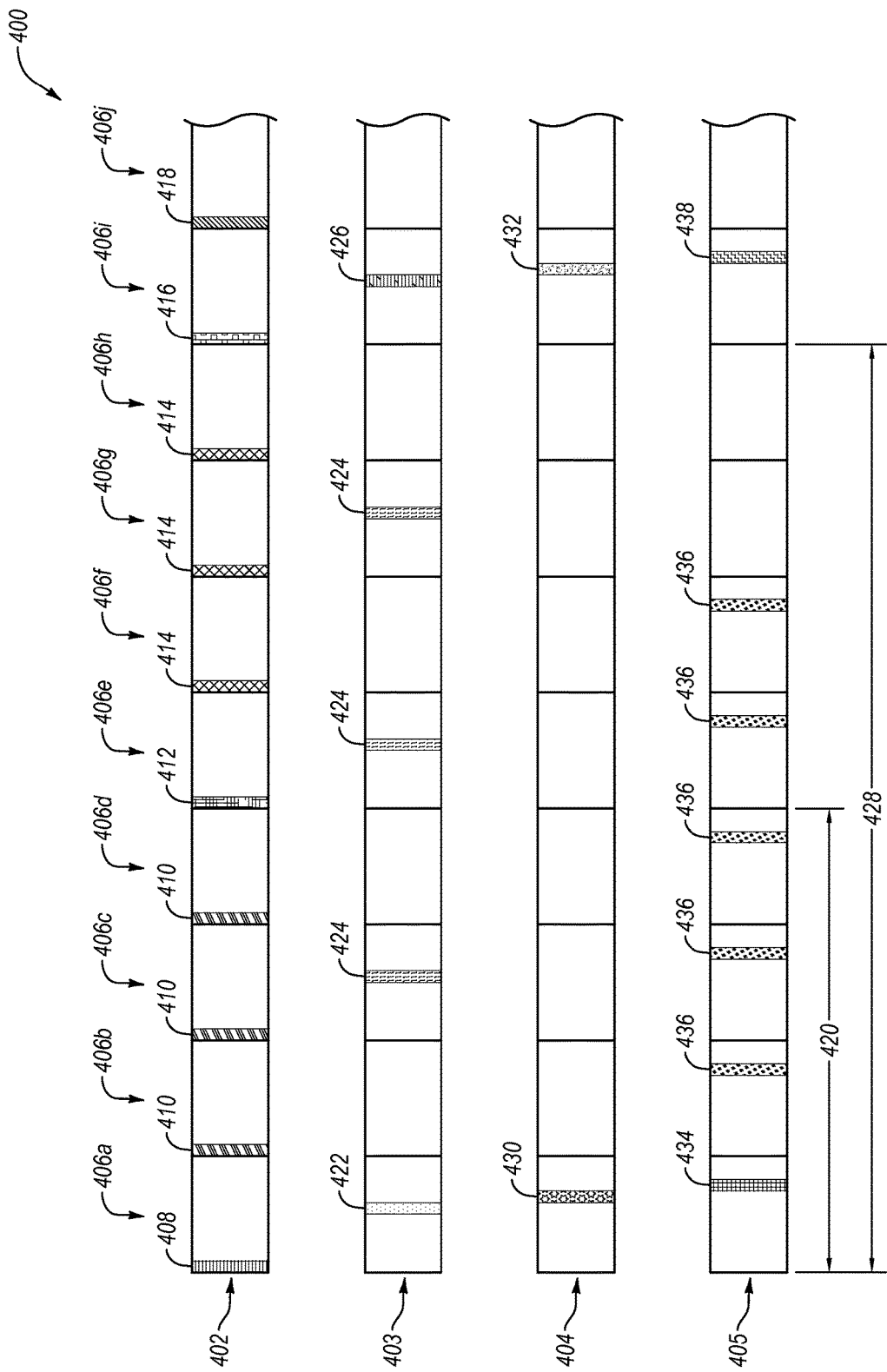
FIG. 4 is a time diagram view of an example system information block transmission scheme that may be implemented in the radio access system of FIG. 1.

FIG. 4 is a time diagram example system information block transmission scheme 400 (hereinafter "scheme 400") that may be implemented in the radio access system 100 of FIG. 1. The scheme 400 may optionally be implemented using a resource allocation having one or more MTC resource allocations. For example, the scheme 400 may be implemented using a resource allocation generally corresponding to the resource allocation 200 of FIG. 2 and/or to the resource allocation 300 of FIG. 3. However, the scheme 400 may be implemented using a resource allocation that does not include an MTC resource allocation.

The scheme 400 may include MIB block transmissions 402, SIB1 block transmissions 403, SIB2 block transmissions 404, and SIB2M block transmissions 405. By way of example, the MIB block transmissions 402, the SIB1 block transmissions 403, the SIB2 block transmissions 404, and the SIB2M block transmissions 405 are shown over a first frame 406a, a second frame 406b, a third frame 406c, a fourth frame 406d, a fifth frame 406e, a sixth frame 406f, a seventh frame 406g, an eighth frame 406h, a ninth frame 406i, and part of a tenth frame 406j (collectively "frames 406"). However, the scheme 400 may continue beyond the frames 406 shown. In some instances, the frames 406 may each be ten milliseconds (ms) in length. The frames 406 may generally correspond to frames associated with LTE radio access networks.

The MIB block transmissions 402 may include a first MIB block transmission instance 408 transmitted during the first frame 406a and repeated first MIB block transmission instances 410 transmitted during the second frame 406b, the third frame 406c, and the fourth frame 406d. The MIB block transmissions 402 may further include a second MIB block transmission instance 412 transmitted during the fifth frame 406e and repeated second blocks 414 transmitted during the sixth frame 406f, the seventh frame 406g, and the eighth frame 406h. Similarly, the MIB block transmissions 402 may further include a third MIB block transmission instance 416 transmitted during the ninth frame 406i and repeated third MIB block transmission instances 418 transmitted during the tenth frame 406j through a twelfth frame (not shown). The timing of the second MIB block transmission instance 412 relative to the repeated first MIB block transmission instances 410 and the timing of the third MIB block transmission instance 416 relative to the second MIB block transmission instance 412 may be based on a periodicity of the MIB block transmissions 402.

In some embodiments, the periodicity of the MIB block transmissions 402 may be equal to an MIB block transmission periodicity 420. The MIB block transmissions 402 may repeat over at least a portion of the MIB block transmission periodicity 420 such that terminals experiencing a coverage deficit may accumulatively detect the MIB block transmissions 402. In some instances, the MIB block transmission periodicity 420 may be 40 ms. However, other MIB block transmission periodicity 420 times may be employed.

In some instances, the individual block transmission instances of the MIB block transmissions 402 may be transmitted at a first one-millisecond subframe of each of the frames 406. For example, the first instance of the MIB block transmissions 402 may be transmitted at a subframe #0 associated with LTE radio access network of frame mod 4 when frame numbering is synchronized by the System Frame Number (SFN) information. The repeated first MIB block transmission instances 410 may follow the MIB block transmissions 402 in the three successive frames, for instance, the repeated first MIB block transmission instances 410 may be transmitted in the frames 4k+1, 4k+2, and 4k+3, where k is a natural number.

In some embodiments, the MIB block transmissions 402 may be made on a central resource allocation, such as a central resource allocation generally corresponding to the central resource allocation 202 of FIG. 2 and/or the central resource allocation 302 of FIG. 3. Alternately or additionally, the MIB block transmissions 402 may be transmitted on an MTC resource allocation, such as an MTC resource allocation generally corresponding to the DL MTC resource allocation 208 of FIG. 2 and/or the DL MTC resource allocation 308 of FIG. 3.

When the MIB block transmissions 402 are transmitted on the central resource allocation, the MIB block transmissions 402 may be similar to MIB block transmissions structure transmitted across LTE radio access networks. In some embodiments, the MIB block transmissions 402 may be similar to the MIB blocks defined with reference to 3GPP LTE specification release 8, but may be otherwise adapted to include an MTC service bit flag and/or one or more bit change flags.

The MTC service flag bit may indicate to a terminal whether the associated base station provides MTC service. Terminals intending to provide MTC services may check the MTC service flag bit transmitted by a base station and may continue with an MTC-specific procedure if the MTC service flag bit is present, indicating that the base station provides MTC service. In some embodiments, terminals intending to provide MTC services may continue looking further for base stations providing MTC service.

Alternately or additionally, each of the change flags may indicate whether information in SIB1 blocks, SIB2 blocks, and SIB2M blocks ("SIB blocks") associated with the individual change flag is different from the previously received SIB blocks within a given amount of time. A terminal may reuse the stored SIB block information instead of decoding and processing the newly received SIB blocks until the associated SIB change flag bit indicates that the information in the associated SIB blocks has changed. The terminal may then decode the respective current SIB block or blocks and update its previously stored SIB block or blocks-related information, and use the current SIB block information until the associated SIB change flag indicates that the information in the associated SIB transmission has changed again. In one embodiment, the stored SIB information referred hereby may be SIB1, SIB2, and SIB2M block data content.

Storing and reusing information in the SIB block content until a change has been made to the information in the SIB transmissions may reduce the detection latency for the terminals and therefore the time required for the terminal to connect to the base station, particularly when these terminals operate in coverage deficit conditions. In response to no changes being made to any of the information from the SIB transmissions stored by a terminal, the terminal may experience a detection latency associated with detecting the MIB transmissions 402, but may avoid additional detection latencies associated with detecting the SIB transmissions. For example, the terminal may experience a detection latency associated with the MIB block transmission periodicity 420.

When the MIB block transmissions 402 are transmitted on the MTC resource allocation, the MIB block may be MTC user and resource allocation specific. In some embodiments, the MIB block may be different from the MIB block associated with LTE radio access networks. By way of example, the MIB block transmissions 402 employing the MTC resource allocation may have a relatively smaller payload, than LTE Rel 8 payload and may include SIB change flags similar to or the same as those described above. A smaller MIB payload reduces the PHY resource allocation requirements, hence allowing more repetitions of the same PBCH instance to be employed, resulting in a lower decoding equivalent SINR.

In some embodiments, when the MIB block transmissions 402 are transmitted on the MTC resource allocation, a MTC service flag bit may not be included. Instead, a terminal may check for the existence of the DL MTC resource allocation to determine whether the associated base station provides MTC service. In some embodiments, this check could be performed by decoding successfully the MTC MIB block.

In some embodiments, the SIB1 block transmissions 403 may be transmitted over a central resource allocation, such as a central resource allocation generally corresponding to the central resource allocation 202 of FIG. 2 and/or the central resource allocation 302 of FIG. 3. Alternately or additionally, the SIB1 block transmissions 403 may be made on an MTC resource allocation, such as an MTC resource allocation generally corresponding to the DL MTC resource allocation 208 of FIG. 2 and/or the DL MTC resource allocation 308 of FIG. 3.

The SIB1 block transmissions 403 may include a first SIB1 block transmission instance 422 transmitted during the first frame 406a and repeated first SIB1 block transmission instances 424 transmitted during the third frame 406c, the fifth frame 406e, and the seventh frame 406g. The SIB1 block transmissions 403 may further include a second SIB1 block transmission instance 426 transmitted during the ninth frame 406i and repeated second SIB1 block transmission instances (not shown) similarly transmitted during a twelfth frame (not shown) and beyond. The timing of the second SIB1 block transmission instance 426 relative to the first SIB1 block transmission instance 422 may be based on a periodicity of the SIB1 block transmissions 403.

In some embodiments, the periodicity of the SIB1 block transmissions 403 may be equal to a system-information-one (SI1) periodicity 428 associated with LTE radio access networks. The SIB1 block transmissions 403 may repeat over the length of the SI1 periodicity 428 such that terminals experiencing a coverage deficit may accumulatively detect the SIB1 block transmissions 403. In some instances, the SI1 periodicity 428 may be 80 ms. However, other SI1 periodicity 428 times may be employed.

In some instances, the individual transmission instances of the SIB1 block transmissions 403 may be transmitted at a sixth one-millisecond subframe of the frames 406 including the SIB1 block transmissions 403, referenced to the SFN. For example, the individual transmission instances of the SIB1 block transmissions 403 may be transmitted at a subframe #5 associated with LTE radio access networks. However, the individual transmission instances of the SIB1 block transmissions 403 may be transmitted, alternately or additionally, over another subframe number of the frames 406.

The SIB1 block transmissions 403 may include information about other subsequent SIB blocks. For example, the SIB1 block transmissions 403 may include information about a timing and periodicity of the SIB2 block transmissions 404 and/or the SIB2M block transmissions 405.

In some embodiments, the SIB2 block transmissions 404 may be made on a central resource allocation, such as a central resource allocation generally corresponding to the central resource allocation 202 of FIG. 2 and/or the central resource allocation 302 of FIG. 3. Alternately or additionally, the SIB2 block transmissions 404 may be made on an MTC resource allocation, such as an MTC resource allocation generally corresponding to the DL MTC resource allocation 208 of FIG. 2 and/or the DL MTC resource allocation 308 of FIG. 3.

The SIB2 block transmissions 404 may include a first SIB2 block transmission instance 430 transmitted during the first frame 406a. The SIB2 block transmissions 404 may include a second SIB2 block transmission instance 432 transmitted during the ninth frame 406i. The timing of the second SIB2 block transmission instance 432 relative to the first SIB2 block transmission instance 430 may be based on a periodicity of the SIB2 block transmissions 404 and the timing of the SIB2 block may be advertised by SIB1 information.

In some instances, the periodicity of the SIB2 block transmissions 404 may be substantially the same as the SI1 periodicity 428. Alternately, the SIB2 block transmissions 404 may have a different, possibly longer periodicity, and/or may be a multiple of the SIB1 block transmissions 403 periodicity. For example, the SIB2 block transmissions 404 may have a periodicity of 80 ms, 160 ms, 320 ms, 640 ms, or the like or any other periodicity.

Although shown as being transmitted at a seventh one-millisecond subframe of the frames 406, e.g., at a subframe #6 associated with LTE radio access networks, the timing of the SIB2 block transmissions 404 may be variable and may be communicated via the SIB1 block transmissions 403.

In some embodiments, the SIB2M block transmissions 405 may be made on a resource allocation, such as a central resource allocation generally corresponding to the central resource allocation 202 of FIG. 2 and/or the central resource allocation 302 of FIG. 3. Alternately or additionally, the SIB2M block transmissions 405 may be made on an MTC resource allocation, such as an MTC resource allocation generally corresponding to the DL MTC resource allocation 208 of FIG. 2 and/or the DL MTC resource allocation 308 of FIG. 3.

The SIB2M block transmissions 405 may include a first SIB2M block transmission instance 434 transmitted during the first frame 406a and repeated first SIB2M block transmission instances 436 during the second frame 406b through the sixth frame 406f. The SIB2M block transmissions 405 may further include a second SIB2M block transmission instance 438 during the ninth frame 406i and repeated second SIB2M block transmission instances (not shown) during the tenth frame 406j through fourteenth frame (not shown). The timing of the second SIB2M block transmission instance 438 relative to the first SIB2M block transmission instance 434 may be based on a periodicity of the SIB2M block transmissions 405.

In some instances, the periodicity of the SIB2M block transmissions 405 may be substantially the same as the periodicity of the SIB2 block transmissions 404. Alternately, the SIB2M block transmissions 405 may have a different periodicity. For example, the SIB2M block transmissions 405 may have a periodicity of 80 ms, 160 ms, 320 ms, 640 ms, or the like or any other periodicity. In some embodiments, the SIB1 block transmissions 403 may indicate one periodicity for both the SIB2 block transmissions 404 and the SIB2M block transmissions 405.

Although shown as being transmitted at an eighth one-millisecond subframe of the frames 406, e.g., at a subframe #7 associated with LTE radio access networks, the timing of the SIB2M block transmissions 405 may be variable and may be communicated via the SIB1 block transmissions 403.

In some embodiments, the SIB2M block transmissions 405 may have a relatively lighter payload relative to the SIB1 block transmissions 403 and/or the SIB2 block transmissions 404. By way of example, the SIB1 block transmissions 403 and/or the SIB2 block transmissions 404 may include up to 480 bits or more each of payload and/or higher layer coding, multiplied by the related higher layer coding. In some embodiments, the SIB2M block transmissions 405 may include 32 bits or more of payload, multiplied by the related higher layer coding. The SIB2M block transmissions 405 may have a lower detection latency relative to the SIB1 block transmissions 403 and/or the SIB2 block transmissions 404.

In some embodiments, the SIB2M block transmissions 405 may have a preamble information portion including 13 bits, a PRACH configuration portion including 28 bits, and a reserved bit. For example, the preamble information portion may include a preambleInfo information element (IE) associated with LTE radio access networks. The preamble information portion may include four bits allocated for the number of RA preamble and another nine bits allocated for preambles Group A configuration. The PRACH configuration portion may include a prach-Config IE having a ten-bit rootSequenceIndex IE and an 18-bit Prach-ConfigInfo IE associated with LTE radio access networks. In some embodiments, six bits of the Prach-ConfigInfo may be spared, as the terminals performing MTC may be stationary. In some embodiments, the six spared bits and the one reserved bit may support an additional group of dedicated PRACH resources, which may be used for PRACH by terminals experiencing coverage deficits or other signaling usage which may be further determined. Although block transmissions and the IEs are described herein as having particular sizes, the block transmissions and/or the IEs may have other sizes. For example, the block transmissions and/or the IEs may include more or fewer bits than described herein.

In some embodiments, the SIB2M block transmissions 405 physical layer (PHY) may additionally include an eight-bit cyclic redundancy check (CRC) for 40 total bits. Alternately or additionally, the SIB2M block transmissions 405 may include low coding of ⅛s, which multiplies the 40 bits and may result into 1920 PHY code bits transmitted across the related six PRB resource allocation and potentially 960 resource elements (REs), since a QPSK modulation may be employed. Some embodiments may transmit these 960 REs over the main central six PRB resource allocations. Other embodiments may use the six PRBs employed by the MTC resource allocation.

In some embodiments, the SIB2M block transmissions 405 PHY may be transmitted across six PRBs for 320 bits per PRB. Alternately or additionally, the SIB2M block transmissions 405 PHY may be quadrature phase-shift keying (QPSK) modulated such that it may be transmitted via 160 PHY-coded SIB2M REs per PRB. For example, the SIB2M block transmissions 405 may occupy one complete subframe, excluding the cell-specific reference signal (CRS), across six PRBs.

A receiver sensitivity for the SIB2M block transmissions 405 may be estimated to be similar to that of the MIB block transmissions 402. Ten repetitions of the SIB2M block transmissions 405 may provide coverage for terminals experiencing −15 dB coverage deficits. In some embodiments, six repetitions of the SIB2M block transmissions 405 may provide coverage for terminals experiencing −15 dB coverage deficits, with the six repetitions of the SIB2M block transmissions 405, including CRC transmissions having a +3 dB power boost. Thus, in some instances, the SIB2M block transmissions 405 may be repeated six times and a periodicity of the SIB2M block transmissions 405 may be equal to the periodicity of the SIB2 block transmissions 404.

The MIB block transmissions 402 may include change flags defined to indicate changes to the SIB1 block transmissions 403 content, the SIB2 block transmissions 404 content, and/or the SIB2M block transmissions 405 content.

Decoding the change flags and re-using stored SIB content, when indicated by the change flags, may decrease latency experienced by terminals if one or more of the SIB1 block transmissions 403 content, the SIB2 block transmissions 404 content, and/or the SIB2M block transmissions 405 content remain unchanged during a certain time window. In some embodiments, the detection time window may be as low as the minimal SIB1 periodicity.

By way of example, a terminal may store the IEs from the previous SIB1 block transmissions 403 (the "SIB1 content information"), the IEs from the SIB2 block transmissions 404 (the "SIB2 content information"), and/or the IEs from the SIB2M block transmissions 405 (the "SIB2M content information") during initial access proceedings with a base station. The terminal may further then monitor the change flags of the MIB block transmissions 402 and may reuse the stored SIB1 content information, and/or the stored SIB2 content information, and/or the stored SIB2M content information if the change flags associated with the SIB1 block transmissions 403, the SIB2 block transmissions 404, and/or the SIB2M block transmissions 405 have a change flag value representing an absence of a change to the associated SIB block. The terminal may further detect the SIB1 block transmissions 403 content, the SIB2 block transmissions 404 content, and/or the SIB2M block transmissions 405 content and may update the stored content information from the SIB1 block transmissions 403, the SIB2 block transmissions 404, and/or the SIB2M block transmissions 405, if the change flags associated with the SIB1 block transmissions 403, the SIB2 block transmissions 404, and/or the SIB2M block transmissions 405 have a change flag value representing a change to the associated SIB block.

In some embodiments, in response to the terminal transitioning from an idle state to a resource control (RRC) connected state, the terminal may check the change flags embedded in the MIB block transmissions 402.

In some embodiments, the change flags may be corresponding bits included in the MIB block transmissions 402. For example, the MIB block transmissions 402 may include a series of three change flag bits, including one that indicates the change status of the SIB1 content information ("SIB1 change bit"), one that indicates the change status of the SIB2 content information ("SIB2 change bit"), and one that indicates the changes status of the SIB2M content information ("SIB2M change bit"). By way of example, if information in any of the related SIB block content has not changed, the associated change bit may be set to a value of zero. Conversely, if information in an SIB transmission has changed, the associated change bit may be set to a value of one.

By way of example, the terminal may detect that the change flags have a value of 000, where the first bit is the SIB1 change bit, the second bit is the SIB2 change bit, and the third bit is the SIB2M bit. In response, the terminal may reuse the stored SIB1 content information, the stored SIB2 content information, and the stored SIB2M content information. The latency experienced by the terminal may thus be associated with detecting the MIB block transmissions 402.

The terminal may detect that the change flags have a value of 001. In response, the terminal may reuse the stored SIB1 content information and the stored SIB2 content information. The terminal may detect the SIB2M block transmissions 405 and may use and update its stored SIB2M content information. The latency experienced by the terminal may thus be associated with detecting the MIB block transmissions 402 and the SIB2M block transmissions 405.

In some embodiments, the terminal may detect the SIB2M block transmissions 405 and may update the stored SIB2M content information regardless of the SIB2M change bit value, if either of the SIB1 change bit or the SIB2 change bit indicates a change in the associated SIB content.

For example, the terminal may detect that the change flags have a value of 101 or 100. In response, the terminal may detect the SIB1 block transmissions 403 content and may use and store updated SIB1 content information. The terminal may also detect the SIB2M block transmissions 405 content and may update its related stored SIB2M content information. The terminal may reuse the stored SIB2 content information. The latency experienced by the terminal may thus be associated with latency detection time triggered by detecting and processing the MIB block transmissions 402, detecting and processing the SIB1 block transmissions 403, and detecting and processing the SIB2M block transmissions 405.

Alternately or additionally, the terminal may detect that the change flags have a value of 011 or 010. In response, the terminal may detect the SIB2 block transmissions 404 content and may update its stored SIB2 content information. The terminal may also detect the SIB2M block transmissions 405 content and may update its stored SIB2M content information. The terminal may reuse the stored SIB1 content information. The latency experienced by the terminal may thus be associated with latency detection time triggered by detecting and processing the MIB block transmissions 402, detecting and processing the SIB2 block transmissions 404, and detecting and processing the SIB2M block transmissions 405.

Alternately or additionally, the terminal may detect that the change flags have a value of 110 or 111. In response, the terminal may detect and process the SIB1 block transmissions 403 content and may update its stored SIB1 content information. The terminal may also detect the SIB2 block transmissions 404 and may update its stored SIB2 content information. The terminal may also detect and process the SIB2M block transmissions 405 and may update its stored SIB2M content information, if the related change flag is set to 1 (as in the 111 change flag registry). The latency experienced by the terminal (when the change flag registry is set to 111) may thus be associated with overall detection and processing time required by detecting and processing the MIB block transmissions 402, the SIB1 block transmissions 403, the SIB2 block transmissions 404, and the SIB2M block transmissions 405.

Figure 5:
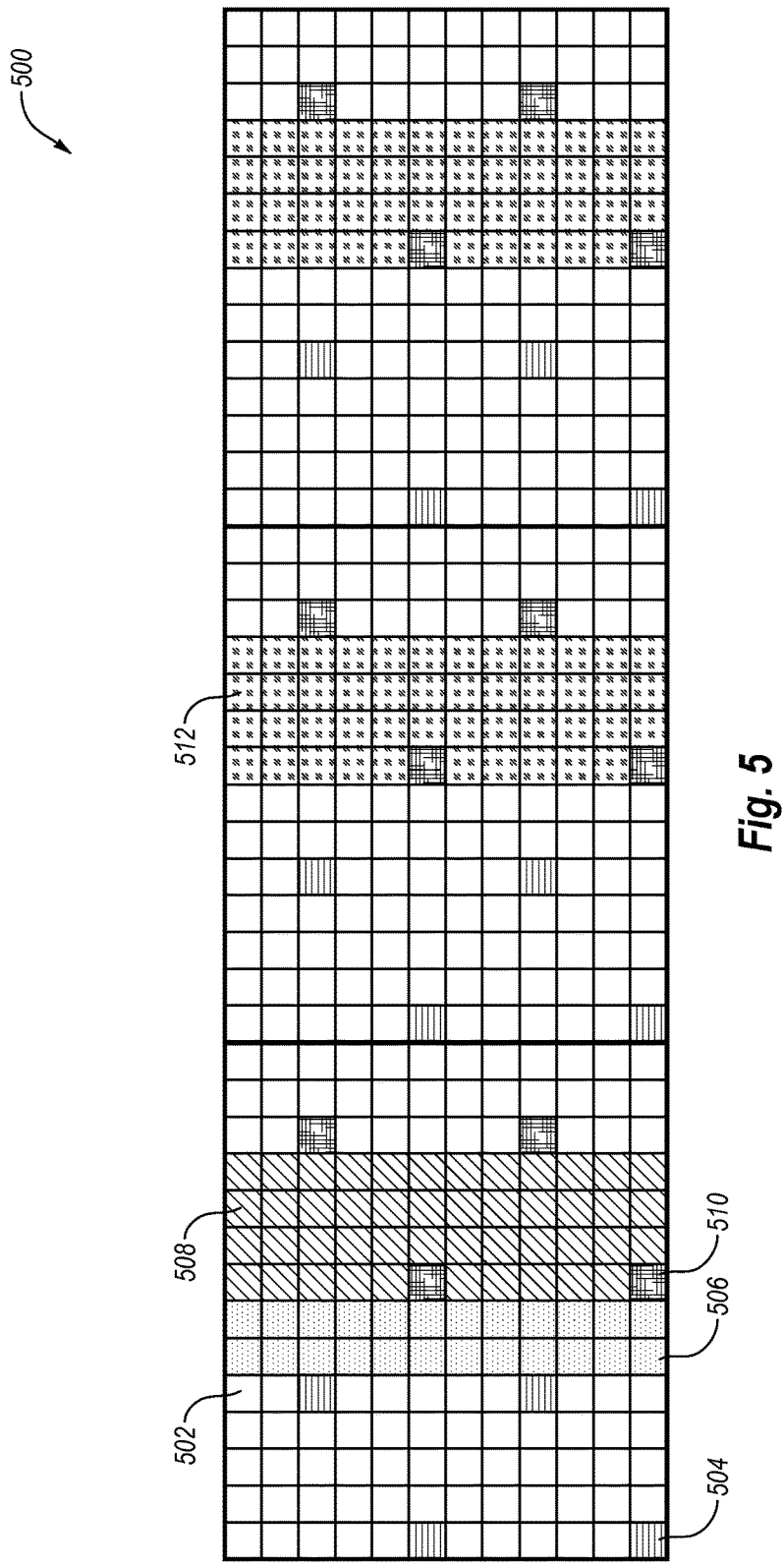
FIG. 5 is a diagrammatic view of an example physical layer resource allocation master-information block (MIB) transmission scheme that may be implemented in the radio access system of FIG. 1.

FIG. 5 is a diagram of an example physical layer (PHY) resource allocation 500 that may be implemented in the radio access system 100 of FIG. 1, if a dual receiver terminal is used, when servicing coverage deficit devices is intended.

In some embodiments, the PHY resource allocation 500, which may be employed to service coverage deficit devices, may represent a repetition-based transmission scheme of the MIB PHY instance generally corresponding to the MIB block transmissions 402 of FIG. 4 made on a central resource allocation generally corresponding to the central resource allocation 202 of FIG. 2 and/or the central resource allocation 302 of FIG. 3. In the case of a two receiver (Rx) MTC device, each MIB instance may be repeated three times, as presented in FIG. 5 within the same frame as the MIB instance. For single Rx MTC devices, the same MIB instance may be repeated six times, within the same frame as the MIB instance. The MTC-adapted MIB content and PHY structure may be similar to an MIB content and PHY structure (except the repetition scheme presented above) associated with LTE radio access networks, but the content may be updated to include an MTC service flag, an SIB1 change flag, an SIB2 change flag, and/or an SIB2M change flag. The amount of repetitions estimated herein could alternatively be increased in some cases implementation and/or propagation channel dependent.

The PHY resource allocation 500 may include user data resource elements 502. In some instances, the user data resource elements 502 may not be used by the PHY resource allocation 500, but may be dedicated for other uses. The PHY resource allocation 500 may include primary synchronization channel (P-SCH) resource elements 506. The P-SCH resource elements 506 may include P-SCH signals associated with LTE radio access networks. Alternately or additionally, the PHY resource allocation 500 may include DL reference signal resource elements 504. The DL reference signal resource elements 504 may include DL reference signals associated with LTE radio access networks. Alternately or additionally, DL reference signal resource elements 510, embedded in the MIB resource allocation, may be power boosted. As an example, a +3-dB-boost may be applied to the DL reference signal resource elements 510, which in return may decrease the MIB decoding SINR.

Alternately or additionally, the PHY resource allocation 500 may include an MTC-PBCH instance including the resource elements 508 (hereinafter "MTC-PBCH resource elements 508"). The MTC-PBCH resource elements 508 may include one instance of a MTC MIB block. The PHY resource allocation 500 may include replica MTC-PBCH instances including the resource elements 512 (hereinafter "replica MTC-PBCH resource elements 512"), which may include repetitions of the MTC-PBCH resource elements 508. Although the replica MTC-PBCH resource elements 512 are shown as repeating twice across two resource-block pairs, the replica MTC-PBCH resource elements 512 may be repeated more or fewer times such that terminals experiencing coverage deficits or not experiencing coverage deficits may detect the MTC MIB block.

In some instances, employing the MTC MIB blocks and/or the SIB2 blocks may employ fewer resources than would repeating conventional MIB blocks and SIB blocks for detection by terminals experiencing coverage deficits.

Figure 6:
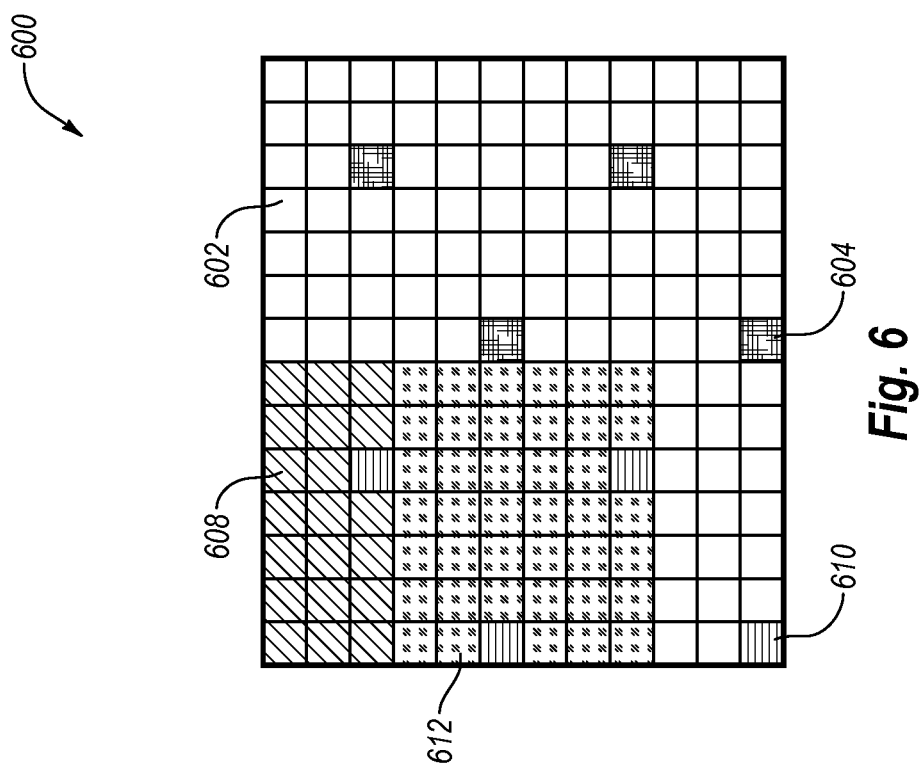
FIG. 6 is a diagram of an example machine-type communication MIB resource allocation that may be implemented in the radio access system of FIG. 1.

FIG. 6 is a diagram of an MTC-band MIB PHY resource allocation 600 that may be implemented in the radio access system 100 of FIG. 1, when servicing coverage deficit devices is intended.

In some embodiments, the PHY resource allocation 600 may represent a PHY resource allocation of an MTC-band MIB block generally corresponding to the MIB block transmissions 402 of FIG. 4 made on an MTC resource allocation, such as an MTC resource allocation generally corresponding to the DL MTC resource allocation 208 of FIG. 2 and/or the DL MTC resource allocation 308 of FIG. 3. The PHY resource allocation 600 may be similarly arranged on additional reference blocks of the MTC resource allocation. Alternately or additionally, the PHY resource allocation 600 may be repeated in time an appropriate number of times to permit terminals experiencing coverage deficits to detect the MTC resource allocation MIB block.

In another embodiment, separate PBCH-carrying MIB block information may be defined on a central resource allocation, such as a central resource allocation generally corresponding to the central resource allocation 202 of FIG. 2 and/or the central resource allocation 302 of FIG. 3. The separate PBCH may be associated with MIB blocks dedicated to terminals operating in coverage deficit conditions. The separate PBCH blocks may carry an MIB block associated with LTE radio access networks.

In some embodiments, the MTC resource allocation MIB block may have a relatively lighter payload than a regular (as per LTE Rel 8 definition) MIB block on the central resource allocation. In some embodiments, the MTC resource allocation MIB block content may be 12 bits in length. These 12 bits may include:

eight bits allocated to the eight most significant bits (MSBs) of SFN information,
three bits for the change bit flags, and
one reserved bit for future use.

The PHY coding may add an eight-bit CRC summing up to 20 total bits. Optionally, the MTC-band MIB transmission may allocate two bits for a physical hybrid automatic repeat-request indicator channel (PHICH).

The PHY coding of this MTC MIB block may include a low level coding of $1/48$, which will produce a total of 960 bits coded PHY MIB payload. In some embodiments, the MTC resource allocation MIB PHY coded block may be QPSK modulated such that it may be transmitted via 480 REs across six PRBs. The MIB PHY coded content will be transmitted over four successive instances, as specified in LTE Rel 8.s.

The MTC resource allocation MIB transmission block may include change flags generally corresponding to the SIB change flags set forth with reference to FIG. 4. No MTC service bit flag may be required in this case.

The PHY resource allocation 600 may include resource elements 602 generally corresponding to data transmissions for different users. The PHY resource allocation 600 may include DL reference signal resource elements 604 generally corresponding to the DL reference signal resource elements 504 of FIG. 5. The PHY resource allocation 600 may use +3-dB boosted DL reference signal resource elements 610, which may improve MTC MIB SINR.

Alternately or additionally, the PHY resource allocation 600 may include MTC-PBCH signal resource elements 608. In some embodiments, the MTC-PBCH signal resource elements 608 may include the MTC MIB content: a system frame number (SFN) portion of the MTC-band MIB transmission. The PHY resource allocation 600 may include two replica MTC-PBCH signal resource elements 612.

In some embodiments, the change flags may be included in the MTC-PBCH signal resource elements 608 and the replica MTC-PBCH signal resource elements 612. In some embodiments, referring to single-receiver MTC devices, the MTC-PBCH signal resource elements 608 may include five replicas (instead of two as represented in FIG. 6).

In some instances, including the MTC-band MIB block transmission on the MTC resource allocation may offer a resource savings relative to the MTC-adapted MIB transmission on the central resource allocation described with reference to FIG. 5.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A wireless communication method comprising:
   detecting a content associated with each of a plurality of system information blocks (SIBs) from the plurality of SIBs using a downlink channel in a wireless communication network;
   storing the content associated with each of the plurality of SIBs;
   detecting, from the downlink channel in the wireless communication network, bits corresponding to a first information associated with a coverage, the coverage corresponding to a Signal-to-Noise-plus-Interference-Ratio (SINR) below a cell edge SINR;
   detecting a second information indicating that the contents associated with each of the plurality of SIBs from the downlink channel are changed when a User Equipment (UE) is determined to have a coverage corresponding to a Signal-to-Noise-plus-Interference-Ratio (SINR) below a cell edge SINR based on the detected bits; and
   when the second information indicates that at least one of the contents stored in the SIBs is changed, invalidating the content in the SIBs whose change was indicated.

2. The method of claim 1, wherein:
   the plurality of SIBs include:
   a system-information-block-one (SIB1) including first system information content;
   a system-information-block-two (SIB2) including second system information content; and
   a system-information-block-x (SIBx), the SIBx including third system information content, the third system information content having a higher refresh rate than both the first system information content and the second information content; and
   a plurality of change flags includes:
   a first change flag associated with the SIB1;
   a second change flag associated with the SIB2; and
   a third change flag associated with the SIBx.

3. The method of claim 2, wherein the SIBx includes a system-information-block-two-machine-type-communication (SIB2M) including content associated with a configuration of a random access channel associated with machine-type-communication (MTC) devices.

4. The method of claim 3, wherein one or more of:
   a transmission including the plurality of change flags,
   the SIB 1,
   the SIB2, and
   the SIB2M are received in a machine-type-communication (MTC) resource allocation.

5. A terminal comprising:
   a memory that stores a plurality of instructions; and
   a processor coupled to the memory and configured to execute the plurality of instructions to:
   detect a content associated with each of a plurality of system information blocks (SIBs) from the plurality of SIBs using a downlink channel in a wireless communication network;
   store the content associated with each of the plurality of SIBs;
   detect, from the downlink channel in the wireless communication network, bits corresponding to a first information associated with a coverage, the coverage corresponding to a Signal-to-Noise-plus-Interference-Ratio (SINR) below a cell edge SINR;
   detect a second information indicating that the contents associated with each of the plurality of SIBs from the downlink channels are changed when the terminal is determined to have a coverage corresponding to a Signal-to-Noise-plus-Interference-Ratio (SINR) below a cell edge SINR based on the detected bits; and
   when the second information indicates that at least one of the contents stored in the SIBs is changed, invalidating the content in the SIBs whose change was indicated.

6. The terminal of claim 5, wherein the plurality of SIBs include:
   a system-information-block-one (SIB1) including first system information content;
   a system-information-block-two (SI2) including second system information content; and
   a system-information-block-x (SIBx), the SIBx including third system information content, the third system information content having a higher refresh rate than both the first system information content and the second information content.

7. The terminal of claim 6, wherein the SIBx includes a system-information-block-two-machine-type-communication (SIB2M).

8. The terminal of claim 7, wherein the SIB2M includes content associated with a configuration of a random access channel associated with machine-type-communication (MTC) devices.

9. The terminal of claim 6, wherein:
   in response to a change flag of a plurality of change flags having a second change flag value, detecting a SIB associated with the change flag and storing the content of the SIB associated with the change flag, the second change flag value representing a change to the content of the SIB associated with the change flag;
   the plurality of change flags includes:
   a first change flag associated with the SIB1;
   a second change flag associated with the SIB2; and
   a third change flag associated with the SIBx;
   in response to receiving the first change flag having the second change flag value, detecting the SIB1 and storing the first system information content;
   in response to receiving the second change flag having the second change flag value, detecting the SIB2 and storing the second system information content; and
   in response to receiving the third change flag having the second change flag value, detecting the SIBx and storing the third system information content.

10. The terminal of claim 5, wherein one or more of the plurality of SIBs are received in a machine-type communication (MTC) resource allocation.

11. The terminal of claim 5, wherein the bits corresponding to the first information associated with the coverage corresponding to a Signal-to-Noise-plus-Interference-Ratio (SINR) below a cell edge SINR are included in a Master Information Block (MIB).

12. The terminal of claim 11, wherein the MIB is received in a machine-type communication (MTC) resource allocation.

13. A base station comprising:
   a memory that stores a plurality of instructions; and
   a processor coupled to the memory and configured to execute the plurality of instructions to:

transmit, in a downlink channel in a wireless communication network, bits corresponding to a first information associated with coverage, the coverage corresponding to a Signal-to-Noise-plus-Interference-Ratio (SINR) below a cell edge SINR;

transmit a content associated with each of a plurality of system information blocks (SIBs) in the downlink channel; and transmit a second information indicating whether the contents associated with each of the plurality of SIBs in the downlink channel are changed when a User Equipment (UE) is determined to have a coverage corresponding to a Signal-to-Noise-plus-Interference-Ratio (SINR) below a cell edge SINR based on the bits corresponding to the first information associated with the coverage corresponding to a Signal-to-Noise-plus-Interference-Ratio (SINR) below a cell edge SINR.

14. The base station of claim 13, wherein transmitting the plurality of SIBs include:

transmitting a system-information-block-one (SIB1) including first system information content;

transmitting a system-information-block-two (SIB2) including second system information content; and transmitting a system-information-block-x (SIBx), the SIBx including third system information content, the third system information content having a higher refresh rate than both the first system information content and the second information content.

15. The base station of claim 14, wherein the SIBx includes a system-information-block-two-machine-type-communication (SIB2M) including content associated with a configuration of a random access channel associated with machine-type-communication (MTC) devices.

16. The base station of claim 14, wherein a plurality of change flags includes:

a first change flag associated with the SIB1;

a second change flag associated with the SIB2; and a third change flag associated with the SIBx.

17. The base station of claim 13, wherein one or more of the plurality of SIBs are transmitted in a machine-type communication (MTC) resource allocation.

18. The base station of claim 13, wherein the bits corresponding to the first information associated with the coverage corresponding to a Signal-to-Noise-plus-Interference-Ratio (SINR) below a cell edge SINR are included in a Master Information Block (MIB).

19. The base station of claim 18, wherein the MIB is transmitted in a central resource allocation.

20. The base station of claim 18, wherein the MIB is transmitted in a machine-type communication (MTC) resource allocation.

* * * * *